United States Patent

[11] 3,568,095

[72] Inventor Giovanni Cordalis
Milan, Italy
[21] Appl. No. 768,055
[22] Filed Oct. 16, 1968
[45] Patented Mar. 2, 1971
[73] Assignee Società Italiana Telecomunicazioni
Siemens S. p. A.
Milan, Italy
[32] Priority Oct. 19, 1967
[33] Italy
[31] 21756-A/67

[54] SELF-BALANCING MODULATOR FOR SUPPRESSION OF CARRIER WAVE
7 Claims, 2 Drawing Figs.

[52] U.S. Cl. 332/24, 307/255, 307/313, 325/138, 330/15, 332/44
[51] Int. Cl. H03c 3/26, H03c 1/52
[50] Field of Search 332/16, 16 (T), 24, 44, 43, 43 (13), 45; 307/255, 313; 325/49, 50, 137, 138; 330/15

[56] References Cited

UNITED STATES PATENTS

| | | | |
|---|---|---|---|
| 2,788,493 | 4/1957 | Zawels | 332/43 |
| 3,101,455 | 8/1963 | Masher | 332/44X |
| 3,160,766 | 12/1964 | Reymond | 307/255 |
| 3,305,796 | 2/1967 | Somer et al. | 325/138X |
| 3,381,234 | 4/1968 | Zane | 330/15X |
| 3,434,066 | 3/1969 | Huntley | 330/15X |
| 3,461,320 | 8/1969 | Eastland | 332/44X |
| 3,484,723 | 12/1969 | Rypkema | 332/44X |

*Primary Examiner*—Alfred L. Brody
*Attorney*—Karl F. Ross

ABSTRACT: Two transistors of opposite conductivity types are connected back-to-back, with their emitters confronting each other, across a source of DC driving voltage for push-pull energization by a carrier wave and parallel energization by an applied low frequency modulating signal. A condenser connected to the junction of the two emitter leads differentially biases the transistors to compensate for unsymmetrical conductivity.

Giovanni Cordalis
INVENTOR

BY

Karl F. Ross
Attorney

SELF-BALANCING MODULATOR FOR SUPPRESSION OF CARRIER WAVE

My present invention relates to a self-balancing modulator for the generation of a pair of sidebands with suppression of the carrier.

In communication systems, particularly those of the multichannel type, carrier suppression is desirable to avoid overloading the line amplifier to which the modulation products are applied. Such carrier suppression is also useful for single-sideband transmission since it allows the use of simpler filters in isolating the sideband to be preserved.

The general object of the present invention is to provide an improved circuit arrangement which, by relatively simple means, modulates a high frequency carrier with a low frequency signal and suppresses in its output both the modulating signal and the carrier along with harmonics thereof.

A more particular object is to provide a modulator of this type which is substantially self-balancing even in the presence of a certain asymmetry of its branches.

These objects are realized, pursuant to my present invention, by the provision of two transistors of opposite conductivity types, i.e. NPN and PNP, having their emitter-collector paths serially connected across a pair of DC terminals in aiding relationship, the bases of these transistors being coupled to a first pair of terminals for energization in push-pull by a carrier wave, these bases being also coupled to a second pair of terminals for energization in parallel by a modulating signal; a third pair of terminals is coupled to the emitter-collector paths of these transistors for the balanced energization of a load in the absence of the modulating signal.

More particularly, according to another feature of my invention, the two transistors are disposed back-to-back in such a way that their emitter leads form a common junction capacitively connected to one of the low-frequency input terminals receiving the modulating signal, the other of these input terminals being preferably connected through another capacitor to the transmitter bases. Any disparity between the average collector currents drawn by the two transistors will then charge these capacitors to bias their input circuits in a differential way tending to correct the imbalance.

The invention will be described in greater detail with reference to the accompanying drawing in which.

Figure 1:
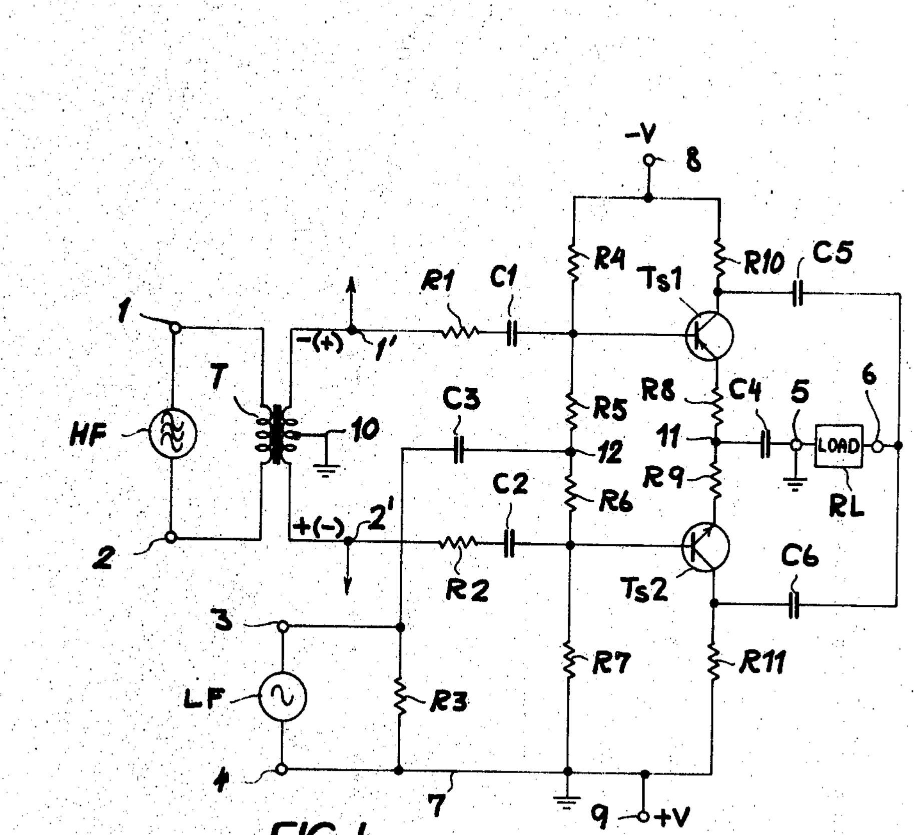
FIG. 1 is a circuit diagram illustrating a representative embodiment.

In FIG. 1 I have shown a modulator having a first pair of terminals 1, 2 connected to a source of carrier waVe HF, a second pair of terminals 3, 4 connected to a source of modulating signal LF, a third pair of terminals 5, 6 connected across a load RL, and a fourth pair of terminals 8, 9 respectively connected to the negative and the positive pole of a source of direct current ±V. Terminals 4, 5 and 9 are all connected to a common ground bus bar 7.

An input transformer T, having its primary connected via terminals 1, 2 across the possibly unbalanced high frequency source HF, has a secondary with grounded center tap 10 and balanced output terminals 1', 2'. These latter terminals are connected via respective resistors R1, R2 and condensers C1, C2 to the bases of a pair of transistors T*s*1 and T*s*2, transistor T*s*1 being of the PNP type whereas transistor T*s*2 of the complementary NPN type. The emitter leads of these transistors, including respective resistors R8, R9, form a common junction 11 which is returned to ground at terminal 5 through a condenser C4. The collectors of the two transistors are coupled to load terminal 6 by way of respective condensers C5 and C6; they are also connected to DC terminals 8 and 9 through respective resistors R10 and R11.

A voltage divider consisting of four resistors R4, R5, R6 and R7 is connected across terminals 8, 9 in parallel with the emitter-collector paths of transistors T*s*1, T*s*2 and their associated emitter and collector resistances. The bases of the transistors receive a biasing potential from respective taps of this voltage divider, specifically from the junctions of resistors R4, R5 and R6, R7; the relative magnitudes of these resistors may be so chosen as to maintain each transistors at or near the point of incipient conduction (e.g. by applying a biasing potential on the order of ± 0.5 volt) to let it operate as a Class B or Class C amplifier. The midpoint 12 of the voltage divider, i.e. the junction of resistors R5 and R6, is connected via a condenser C3 to terminal 3 of low frequency source LF; this source is bridged by a resistor R3 designed to match its internal impedance.

Capacitors C1 and C2 as well as C5 and C6 serve as blocking condensers to prevent the flow of direct current. Capacitors C3 and C4 have the additional function of building up a differential bias for the base-emitter circuits of transistors T*s*1 and T*s*2 , as will be more fully explained hereinafter.

Leads emanating from terminals 1' and 2' may extend to other modulators of similar construction energized by the same carrier wave source HF. Input resistors R1 and R2 serve to decouple the several modulators from one another and could be omitted if the system contains only one modulator; resistors R8 and R9 may also be reduced to zero in a limiting case.

In the ideal situation, the two branches of the modulator including transistors T*s*1 and T*s*2 are perfectly symmetrical, with R1 = R2, R5 = R6, R4 = R7, R8 = R9, R10 = 11, C1 = C2, C5 = C6 and with the two transistors drawing identical currents upon the application of negative and positive voltages of equal magnitudes to terminals 1' and 2', respectively. In that case the transistors, in the absence of a modulating signal from source LF, will symmetrically discharge the condensers C5 and C6 during conductive half-cycles of the carrier wave, i.e. when the terminals 1' and 2' carry the indicated negative and positive potentials, respectively, and will allow these condensers to charge through resistors R10 and R11 during alternate half-cycles when these polarities are reversed as noted in parentheses, the resulting current flow in the output circuit C5, C6, R8, R9 being without effect upon the load RL.

If the presence of an input signal across terminals 3, 4 temporarily unbalances the system, the increased conductivity of one transistor (i.e. sT*s*1 if terminal 3 goes negative with reference to ground) develops in the output circuit a differential oscillation which traverses the load RL and whose amplitude depends on the magnitude of the signal; a reversal in the polarity of the modulating signal results in a 180° phase shift of the load current as is typical in amplitude modulation with suppression of the carrier. Condensers C3 and C4 are, of course, of sufficiently high capacitance to offer a low impedance for the modulating signal.

If, however, an inherent asymmetry produces a permanent imbalance, as will usually be the case on account of inevitable design tolerances, a DC charge will build up across condenser C4 during operation of the system. Thus, for example, if the conductivity of transistor T*s*1 in the discharged state of condenser C4 is greater than that of transistor ss2, junction 11 will be driven negative with reference to the conjugate junction 12 of resistors R5, R6; the resulting bias increases the conductivity of transistor T*s*2 and reduces that of transistor T*s*1 so as to restabilize the system at a new operating point at which the emitter currents $i_{e1}$ and $i_{e2}$ of the two transistors have the same mean value. The corresponding collector currents $i_{c1}= \alpha_1 i_{e1}$ and $i_{c2}= \alpha_2 i_{e2}$ may still differ if $\alpha_1 \neq \alpha_2$, since, however, $\alpha_1 = \beta_1/(1+\beta_1)$ and $\alpha_2 = \beta_2/(1+\beta_2)$ where $\beta_1$ and $\beta_2$ are the current gains of the two transistors, the mean values of the two collector currents will be substantially equal if $\beta_1$ and $\beta_2$ are large. As the alternating component of the collector current is proportional the means value of that current, the dynamic balance of the system will be similarly preserved.

I have found that a modulator of the type shown in FIG. 1 can be operated with a residual carrier level which is 20 to 30 db. lower than that of conventional two-transistor modulators.

The ground return from the midpoint 10 of the secondary of transformer T could be omitted, with a resultant reduction in the flow of carrier current; this diminishes the ability of source HF to energize several modulators in parallel and, in practice, will be of interest only where a single modulator is to be fed from that source, with possible omission of resistors R1 and R2.

Figure 2:
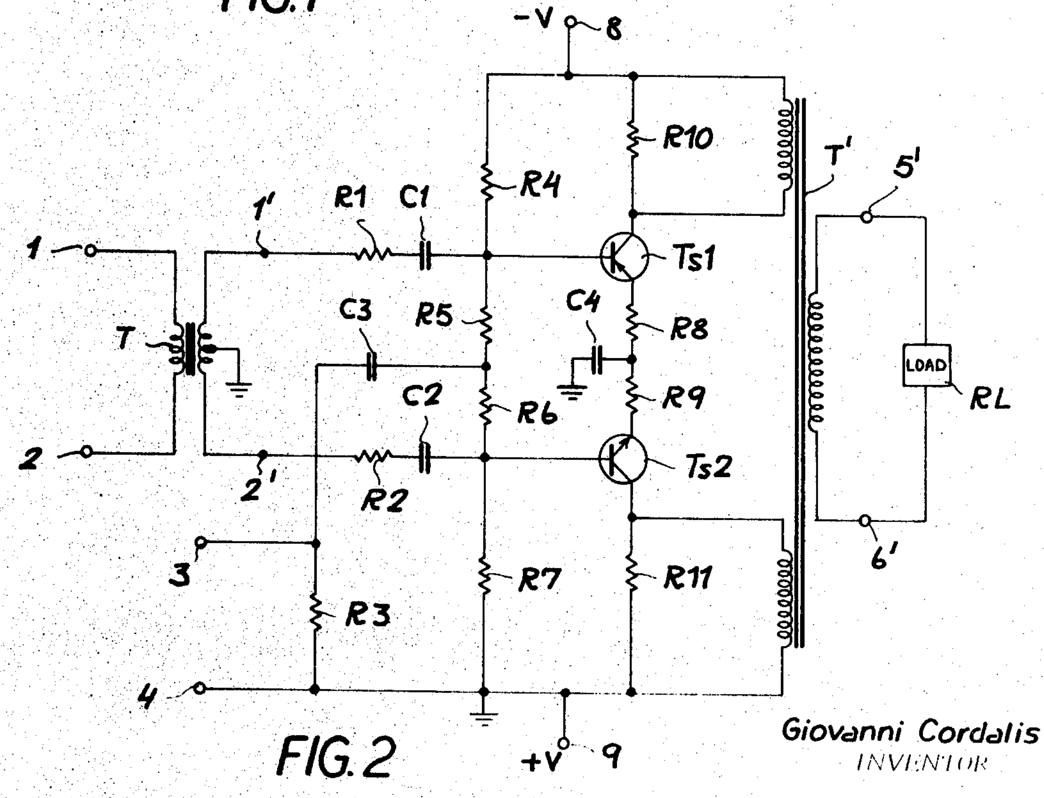
FIG. 2 is a diagram similar to FIG. 1, showing a modification.

In FIG. 2 I have shown, in an otherwise identical system, the use of an output transfer T' to drive the lead RL, this transformer having two primaries respectively connected across resistors R10, R11 and a secondary working into load terminal 5',6'. The two primaries of transformer T' are poled in mutually opposing relationship so that no load current flows when the system is in balance.

I claim:

1. A circuit arrangement for modulating a carrier wave with a low frequency signal and preserving the resulting sidebands while suppressing the carrier wave, comprising:
   - a first pair of terminals connectable across a source of carrier wave to be modulated;
   - a second pair of terminals connectable across a source of modulating signal;
   - a third pair of terminals connectable across a load;
   - a fourth pair of terminals connectable across a source of direct current;
   - two transistors of opposite conductivity types each having a base, an emitter with a lead and a collector, the emitter leads of said transistors forming a junction, the emitter-collector paths of said transistors being serially connected across said fourth pair of terminals in aiding relationship;
   - first circuit means coupling said first pair of terminals in push-pull [parallel] to the base-emitter paths of said transistors;
   - second circuit means coupling said second pair of terminals in parallel to the base-emitter paths of said transistors, said second circuit means including capacitive means connected to said junction for differentially biasing the emitters of said transistors in response to unsymmetrical current flow over said emitter-collector paths; and
   - and third circuit means coupling said third pair of terminals to said emitter-collector paths for balanced energization thereby in the absence of said modulating signal.

2. A circuit arrangement as defined in claim 1 wherein said leads include respective resistors between said junction and said emitters.

3. A circuit arrangement as defined in claim 1, further comprising a voltage divider connected across said fourth pair of terminals, the bases of said transistors being connected to respective taps on said voltage divider, said second circuit means further including a capacitive connection between one of said second pair of terminals and the midpoint of said voltage divider.

4. A circuit arrangement as defined in claim 3 wherein said first circuit means includes a pair of condensers respectively coupling said taps to said first pair of terminals.

5. A circuit arrangement as defined in claim 1 wherein said third circuit means includes an output transformer.

6. A circuit arrangement as defined in claim 1 wherein said first circuit means includes an input transformer.

7. A circuit arrangement as defined in claim 6 wherein said input transformer has a balanced secondary with a center tap connected to a terminal of each of said second, third and fourth pairs of terminals.